Patented Jan. 2, 1951

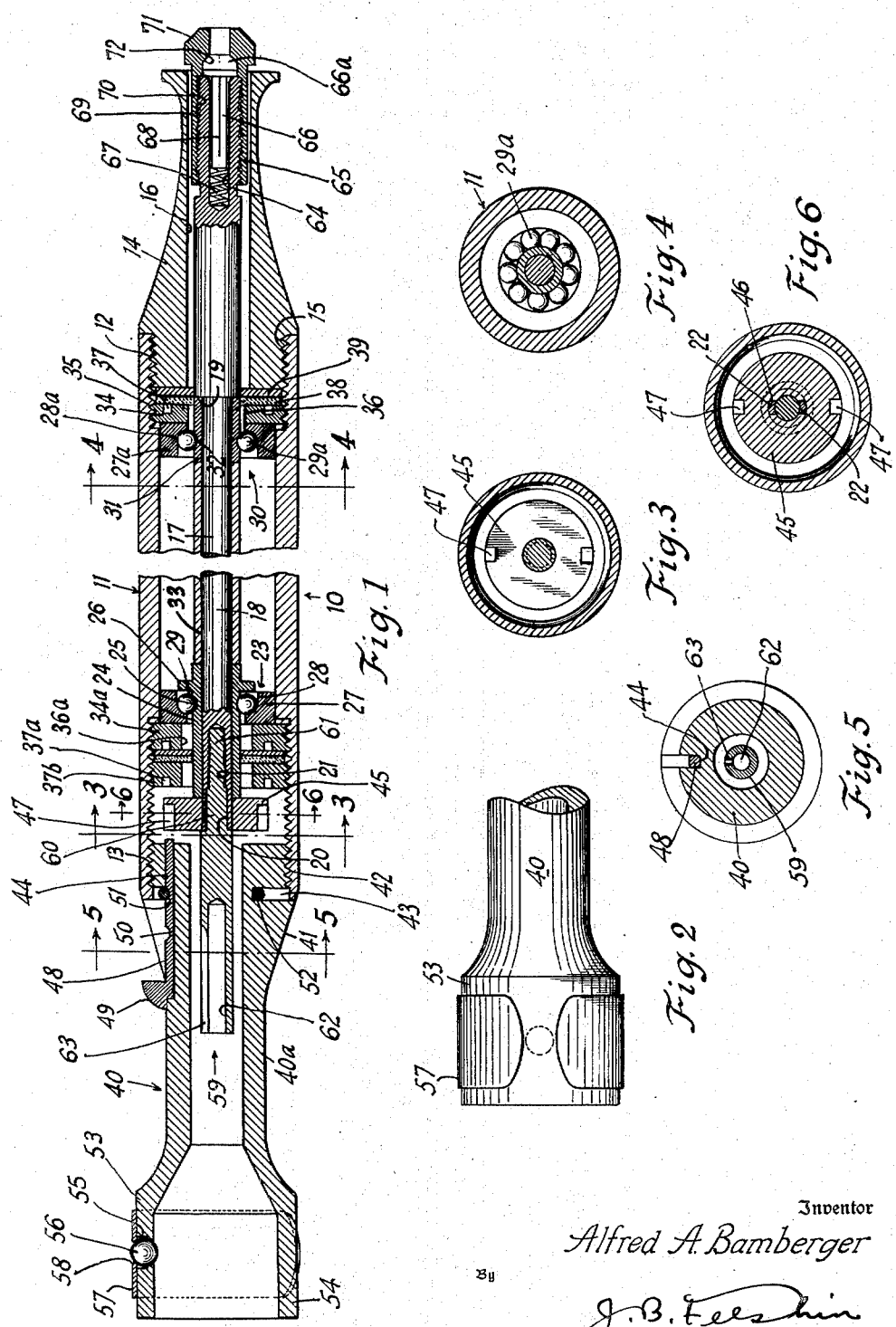

2,536,017

UNITED STATES PATENT OFFICE 2,536,017

ROTARY TOOL HAND PIECE

Alfred A. Bamberger, Flushing, N. Y., assignor to Speedo Manufacturing Co., Inc., New York, N. Y.

Application April 22, 1947, Serial No. 743,085

11 Claims. (Cl. 74—527)

This invention relates to a rotary tool hand piece of the type that may be connected to a rotary flexible shaft.

An object of this invention is to provide a device of the character described which includes a rotating shaft disposed within a casing, having a chuck attached to one end thereof and a flexible shaft coupling attached to the other wherein means is provided for fixing said shaft against rotation when it is desired to insert or remove a tool from the chuck.

Another object of this invention is to provide in a device of the character described a rotatable shaft mounted within a casing, a collar fixed on said shaft for rotation therewith and means on the casing which is adapted to engage the collar, upon movement in one direction, thereby preventing rotation of the shaft.

Still another object of this invention is to provide in a device of the character described, a rotatable shaft mounted within a casing, the said mounting comprising a pair of ball bearings having their outer races fitted in the casing and the inner races disposed in spaced relation on said shaft and maintained in such position by a spacing sleeve disposed on the shaft.

Yet another object of this invention is to provide in a device of the character described, a tubular casing, having internally threaded end portions, a shaft rotatably mounted within the casing, a pair of ball bearings having their inner races disposed in spaced relation on said shaft being separated by a spacing sleeve disposed on the shaft and clamping washers screwed into either end of the casing, said washers engaging outer races of said ball bearings.

Still a further object of this invention is to provide a compact and durable device of the character described which shall be relatively inexpensive to manufacture, easy to manipulate, which shall be smooth and positive operation, and yet practical and efficient to a high degree in use.

Other objects of this invention will in part be obvious and part hereinafter pointed out.

This invention accordingly consists in the features of construction, combinations of elements, and arrangement of parts which will be exemplified in the construction hereinafter described and of which the scope of application will be indicated in the following claims.

In the accompanying drawing, in which is shown one of the various possible illustrative embodiments of this invention:

Fig. 1 is an axial cross-sectional view of a device embodying the invention;

Fig. 2 is a bottom plan view of the connector sleeve portion of the device shown in Fig. 1;

Fig. 3 is a cross-sectional view taken on the line 3—3 of Fig. 1;

Fig. 4 is a cross-sectional view taken on the line 4—4 of Fig. 1;

Fig. 5 is a cross-sectional view taken on the line 5—5 of Fig. 1; and

Fig. 6 is a cross-sectional view taken on the line 6—6 of Fig. 1.

Referring now in detail to the drawing, 10 designates a device embodying the invention. The same comprises a tubular casing 11 having an internally screw threaded open ended portion 12 at its forward end and an internally screw threaded portion 13 at its rearward end. A tapered nose piece 14 coaxial with the casing 11 and having an externally threaded rear portion 15 of reduced outside diameter, is screwed into the threaded portion 12 of the casing. The nosepiece 14 is formed with an axial through bore 16. A rotatable shaft 17 is mounted within the casing 11, having its forward end disposed in the bore 16 of the nosepiece 14 and the rear end thereof extending short of the rear end of the casing. A portion 18 of the shaft 17 disposed within the casing 11 is of reduced external diameter, forming a shoulder 19 disposed rearwardly of the threaded portion 12 of the casing 11. The rear end of the portion 18 of the shaft 17 is formed with an axial recess 20 from which extends inwardly an axial threaded recess 21 of a diameter less than that of the recess 20. Extending rearwardly from the end of the shaft portion 18 are a pair of projecting aligned lugs 22. The rear end of the shaft portion 18 is supported by a ball bearing 23 which comprises an inner bearing sleeve 24 formed with an annular groove 25, and force fitted on the shaft portion 18. The sleeve 24 comprises an outwardly extending annular flange portion 26 at its forward end. The bearing 23 further comprises an outer bearing sleeve 27 force fitted within the casing 11. The sleeve 27 is formed with annular recess 28 extending inwardly from the forward end of the sleeve. The recess 28 is disposed opposite the annular groove 25 in the bearing sleeve 24 forming a race way for bearing balls 29. Similarly a ball bearing 30 is disposed on the forward end of the shaft portion 18. The bearing 30 comprises an inner bearing sleeve 31 force fitted on the shaft portion 18 and abutting the shoulder 19. The sleeve 31 is formed with an annular circumferential groove 32. The outer bearing 30 further comprises a sleeve 27a supported by the casing 11 and formed with an annular ball race 28a disposed opposite the groove 32 in the sleeve 31, thereby forming a race way for balls 29a. The inner bearing sleeves 24 and 31 are maintained in their positions on the shaft portion 18 by a separating sleeve 33 on the shaft portion 18 and interposed between the bearing sleeves.

The bearings 23 and 30 are fixed in their relative position by means of a clamping washer 34 having a screw threaded circumferential portion 35 screwed into the threaded portion 12 of the casing 11. The clamping washer 34 is formed with a through opening 36 through which the sleeve 31 passes and is further formed with aligned recesses 37 on its forward surface to permit the use of an appropriate tool for screwing the washer into a position pressing against the outer bearing sleeve 27a. Similarly a clamping washer 34a is screwed into the screw threaded portion 13 of the casing 11 pressing against the outer bearing sleeve 27. The clamping washer 34a is also formed with a through opening 36a in which is disposed the inner bearing sleeve 24 and with aligned recesses 37a on its rearward surface for receiving a turning tool.

A brass washer 38 and a felt washer 39 are successively mounted on the sleeve 31 and the shaft 17 being interposed between the clamping washer 34 and the rear end of the portion 15 of the housing 14. The brass washer 38 and the felt washer 39 are adapted to keep dust out of the interior of the casing 11. Similar brass and felt washers are disposed on the sleeve 24 and are pressed against the clamping washer 37a by a similar clamping washer 37b screwed into the threaded portion 13 of the casing 11.

A sleeve 40 forming a handle and connector member for interconnecting a flexible shaft to the shaft 17 is disposed coaxially with casing 11 and is screwed into the casing. The sleeve 40 comprises an intermediate tubular portion 40a from which extends a tapered forward portion 41. Extending from the tapered portion 41 is an externally threaded portion 42 which engages the threaded end portion 13 of the casing 11. The sleeve 40 is formed with an annular groove 43 disposed between the tapered portion 41 and the threaded portion 42. When the sleeve 40 is screwed into the casing 11, the forward end of the tapered portion 41 abuts the end of the casing 11. The tubular portion 40a of the sleeve 40 is formed with a longitudinally disposed through opening 44 parallel to the axis of the sleeve extending through the tapered portion 41 and the threaded portion 42 for the purpose hereinafter described.

Means is provided for locking the shaft 17 against rotation. To this end, a disc 45 is mounted on the end of the shaft portion 18 of shaft 17 for rotation therewith. The disc 45 is formed with a centrally located key hole slot 46 which engages the projecting lugs 22 on the shaft portion 18, thereby preventing rotation of the disc on the shaft. The disc 45 is further formed with oppositely disposed recesses 47 on the rear face thereof. The recesses 47 on the disc 45 are adapted to be aligned with the opening 44 in the sleeve 40. A lock pin or finger 48 is mounted on the sleeve 40 for slidable movement in the opening 44. The lock pin 48 comprising a finger piece 49 on the rear end thereof is formed on an intermediate portion of its upper surface with a pair of spaced, transversely disposed grooves 50, 51. A split circular spring 52 is disposed in the groove 43 of the sleeve 40. The spring 52 is adapted to fix the pin 48 in either its forward or retracted position by engaging the grooves 50 or 51 therein. Upon pressing the finger piece 49 on the pin 48 in a forward direction, the end of the pin will project into one of the recesses 47 on the disc 45 thus locking the shaft 17 against rotation. In this position the spring 52 engages the groove 50 on the pin 48, maintaining the pin in such position. When the shaft 17 is to be disengaged to permit free rotation thereof, the pin 48 is retracted, the spring 52 permitting the rearward movement of the pin and snapping into the groove 51 to maintain the pin in its rearmost position.

A conventional type of rotary flexible shaft, not shown, is adapted to be connected to the device 10 for imparting rotary motion to the shaft 17. To this end means is provided on the device 10 for effecting such a connection. The sleeve 40 is adapted to removably receive the connector member on the end of such a flexible shaft and accordingly comprises a rearwardly extending enlarged tapered tubular portion 53 from which extends an annular wall 54. The wall 54 is formed with a through recessed opening 55 in which is seated a ball 56. The ball 56 projects above and below the wall 54. A split spring sleeve 57 formed with a through opening 58 encircles the wall 54. The opening 58 in the sleeve 57 is of a diameter smaller than that of the ball 56. The sleeve 57 is so disposed on the wall 54 that the ball 56 projects through the opening 58 therein, yet is maintained in the recessed opening 55 in the wall 54 of the sleeve.

A shaft extension 59 for receiving the end of the flexible shaft is disposed within the sleeve 40 and is attached to the rear end of the shaft portion 18 of the shaft 17. The shaft extension 59 comprises a forwardly extending portion 60 of reduced diameter, which is disposed within the recessed portion 20 of the shaft portion 18 of the shaft 17. Extending from the portion 60 of the extension is a portion 61 of further reduced diameter which is externally screw threaded and engages the threaded recess portion 21 of the shaft portion 18. The extension 59 is formed with an axial recess 62 extending inwardly from its rear end. The extension 59 is also formed with a longitudinally extending slot 63 which communicates with the recess 62. The end of flexible shaft which is received in the recess 62, also includes an upstanding key portion which is adapted to engage the slot 63 thereby locking the flexible shaft to the shaft extension.

The forward end of the shaft 17 is formed with an inwardly extending axial recess 64 and also comprises a screw threaded external portion 65. A collet 66 having tapered outer end portions 66a is disposed within the recess 64 and a coil spring 67 is interposed between the end of the collet and the rear portion of the recess 64. The collet 66 is formed with a plurality of longitudinal slits 68. A sleeve 69 having internally screw threaded portions 70 is screwed on to the threaded portion 65 of the shaft 17. The sleeve 69 comprises a head portion 71 disposed outwardly of the housing 14. The head portion 71 is formed with tapered inner portions 72 which are disposed in abutting relation to the tapered end portion 66a of the collet 66. Upon screwing the sleeve 69 inwardly, the split portion of the collet are constricted, thereby being adapted to grip the shank of a tool placed within the axial portion of the collet. Turning the sleeve 69 to produce outward movement thereof will loosen the constricted portions of the collet, permitting the tool to be removed.

It is understood that when a tool is to be inserted in the collet or to be removed therefrom, the operator moves the locking pin 48 into engagement with the stop washer 45 as previously described. This locks the shaft 17 against rotation while permitting the rotation of the sleeve 69 to constrict or loosen the split portions of the collet 66. After the tool has been inserted and locked in place, the locking pin 48 is retracted thereby permitting the rotation of the shaft 17 through its connection to a rotary flexible shaft which is connected by way of the sleeve 40.

It will thus be seen that there is provided a device in which the several objects of this invention are achieved, and which is well adapted to meet the conditions of practical use.

As various possible embodiments might be made of the above invention, and as various changes might be made in the embodiment above set forth or shown in the accompanying drawing is to be interpreted as illustrative and not in a limiting sense.

Having thus described my invention I claim as new and desire to secure by Letters Patent:

1. A rotary tool hand piece comprising a casing, a member on said casing coaxial therewith, a rotatable shaft within the casing, chuck means on one end of said shaft, and means slidable on said member in directions parallel to the axis of said shaft for releasably locking said shaft against rotary motion.

2. A rotary tool hand piece comprising a casing, a sleeve on said casing coaxial therewith, a rotatable shaft within the casing, chuck means on one end of said shaft, and means for releasably locking said shaft against rotary motion, said means comprising a member rotatable with the shaft and a member movably mounted on said sleeve for movement in directions parallel to the axis of said shaft and interengaging means on said members.

3. A rotary tool hand piece comprising a casing, a sleeve on said casing coaxial therewith, a rotatable shaft within the casing, chuck means on one end of said shaft, and means for releasably locking said shaft against rotary motion, said means comprising a member rotatable with the shaft and a member movably mounted on said sleeve and interengaging means on said members, means to selectively retain said movable member in engaging and non-engaging positions relative to said first member.

4. A rotary tool hand piece comprising a casing, a sleeve on said casing coaxial therewith, a rotatable shaft within the casing, chuck means on one end of said shaft, and means on said sleeve for releasably locking said shaft against rotary motion, said locking means comprising a member longitudinally slidable within said casing in directions parallel to the axis of said shaft, a member rotatable with said shaft, and engageable by said slidable member.

5. A rotary tool hand piece comprising a casing, a sleeve on said casing coaxial therewith, a rotatable shaft within the casing, chuck means on one end of said shaft, and means on said sleeve for releasably locking said shaft against rotary motion, said locking means comprising a member longitudinally slidable within said casing, a member rotatable with said shaft, and engageable by said slidable member, and spring pressed means to selectively retain said slidable member in locking and unlocking positions.

6. A rotary tool hand piece comprising a casing, a sleeve on said casing coaxial therewith, a rotatable shaft within the casing, chuck means on one end of said shaft, and means on said sleeve for releasably locking said shaft against rotary motion, said locking means comprising a member longitudinally slidable within said casing in a direction parallel to the axis of said shaft, a member rotatable with said shaft, and engageable by said slidable member, said first member having a finger engageable part located outside of the casing.

7. A rotary tool hand piece comprising, a tubular casing, a sleeve on said casing coaxial therewith, a shaft disposed axially of the casing, said shaft including a pair of spaced annular grooved portions forming inner ball bearing races, a pair of outer ball bearing races fitted within said casing, balls between said inner races and outer races, a chuck at one end of the shaft, means at the other end of the shaft for engaging a flexible rotating drive means, a disc fixed to said shaft for rotation therewith, and formed with a recess, and a slide slidably mounted on said sleeve for movement parallel to the axis of rotation of said disc and engageable within said recess.

8. A rotary tool hand piece comprising, a tubular casing, a shaft disposed axially of the casing, a sleeve on said casing coaxial therewith said shaft including pair of spaced annular grooved portions forming inner ball bearing races, a pair of outer ball bearing races fitted within said casing, balls between said inner races and outer races, a chuck at one end of the shaft, means at the other end of the shaft for engaging a flexible rotating drive means, a disc fixed to said shaft for rotation therewith, and formed with a recess, and a slide slidably mounted on said sleeve for movement parallel to the axis of rotation of said disc and engageable within said recess, said slide having a finger engageable part outside of the sleeve.

9. A rotary tool hand piece comprising a tubular casing, a shaft passing axially through said casing, a pair of sleeves force-fitted on said shaft and spaced from one another, a spacing sleeve on said shaft and between said pair of sleeves, said pair of sleeves being formed with annular grooves forming inner ball bearing races, a pair of outer ball bearing races fitted within said tubular casing, bearing balls between said inner and outer races, means on said casing to press said outer races inwardly toward each other, a chuck at one end of said shaft and means at the other end of said shaft for engaging a flexible rotary drive means, a nosepiece at one end of said tubular casing, a sleeve at the other end of said tubular casing and formed with a longitudinal hole, a pin slidably mounted in said hole for movement parallel to the axis of said shaft and a disc mounted on said shaft for rotation therewith and being formed with a recess to receive said slidable pin.

10. A rotary tool hand piece comprising a tubular casing, a shaft passing axially through said casing; a pair of sleeves force-fitted on said shaft and spaced from one another, a spacing sleeve on said shaft and between said pair of sleeves, said pair of sleeves being formed with annular grooves forming inner ball bearing races, a pair of outer ball bearing races fitted within said tubular casing, bearing balls between said inner and outer races, means on said casing to press said outer races inwardly toward each other, a chuck at one end of said shaft and means at the other end of said shaft for engaging a flexible rotary drive means, a nose piece at one end of said tubular casing, a sleeve at the other end of said tubular casing and formed with a longitudinal hole, a pin slidably mounted in said hole for movement parallel to the axis of said shaft and a disc mounted on said shaft for rotation therewith and being formed with a recess to receive said slidable pin, and spring means to retain said sliding pin in a position engaging said recess and in a retracted position in disengagement with respect to said disc.

11. A rotary tool hand piece comprising a tubular casing, a shaft passing axially through said casing; a pair of sleeves force-fitted on said shaft and spaced from one another, a spacing sleeve on said shaft and between said pair of sleeves, said pair of sleeves being formed with annular grooves forming inner ball bearing races, a pair of outer ball bearing races fitted within said tubular casing, bearing balls between said inner and outer races, means on said casing to press said outer races inwardly toward each other, a chuck at one end of said shaft and means at the other end of said shaft for engaging a flexible rotary drive means, a nose piece at one end of said tubular casing, a sleeve at the other end of said tubular casing and formed with a longitudinal hole, a pin slidably mounted in said hole for movement parallel to the axis of said shaft and a disc mounted on said shaft for rotation therewith and being formed with a recess to receive said slidable pin, and spring means to retain said sliding pin in a position engaging said recess and in a retracted position in disengagement with respect to said disc, and said pin being formed with a finger engaging part located externally of said sleeve.

ALFRED A. BAMBERGER.

REFERENCES CITED

The following references are of record in the file of this patent:

UNITED STATES PATENTS

| Number | Name | Date |
|---|---|---|
| 1,090,530 | Grube | Mar. 17, 1914 |
| 1,320,582 | Sperling | Nov. 4, 1919 |
| 1,382,881 | Ash | June 28, 1921 |
| 1,682,216 | Dellaree | Aug. 28, 1928 |
| 2,147,915 | Morris | Feb. 21, 1939 |
| 2,211,216 | Oster | Aug. 13, 1940 |
| 2,342,610 | Elliott | Feb. 22, 1944 |